March 30, 1937. F. W. VODOZ 2,075,149
STOKER
Filed March 14, 1932 11 Sheets-Sheet 1

Fig.1

Inventor
Frederick W. Vodoz
Offield Mehlhope Scott & Poole
Attorneys

March 30, 1937. F. W. VODOZ 2,075,149
STOKER
Filed March 14, 1932 11 Sheets-Sheet 2

Fig. 2

Inventor
Frederick W. Vodoz
Attorneys.

March 30, 1937.　　F. W. VODOZ　　2,075,149
STOKER
Filed March 14, 1932　　11 Sheets-Sheet 3

Inventor
Frederick W. Vodoz
Offield Towle Hope Peat & Poole
Attorneys March 30, 1937. F. W. VODOZ 2,075,149
STOKER
Filed March 14, 1932 11 Sheets-Sheet 7

Inventor
Frederick W. Vodoz
Attorneys

Inventor
Frederick W. Vodoz
Offield Melchape Peatt & Poole
Attorneys

Patented Mar. 30, 1937

2,075,149

UNITED STATES PATENT OFFICE 2,075,149

STOKER

Frederick W. Vodoz, Wilmette, Ill.

Application March 14, 1932, Serial No. 598,559

5 Claims. (Cl. 110—109)

This invention relates to improvements in automatic stoking devices for furnaces and the like, and more particularly to the type of stoker having means responsive to variations in the volume of fuel in the fire-box for automatically adding new fuel and for shaking down the fire when necessary.

More specifically, my present invention relates to the overfeed volume-responsive type of stoker such as broadly disclosed in my prior applications bearing Serial No. 318,662 filed November 12, 1928, Patent No. 1,863,677 and Serial No. 447,154 filed April 25, 1930, but includes simplified and improved control, feeding and ash-shaking mechanism. Other and more detailed features of improvement will appear from time to time from the following description.

The invention may best be understood by reference to the accompanying drawings, in which

Figure 17 is a detail view of a modified form of interlocking connection between the rear end of the ram and shovel.

Referring now to details of the device shown in the drawings and illustrating one form in which my invention may be embodied, 10 indicates a hot air furnace of the ordinary household type including a fire box 11, grate 12 and ash pit 13, all of the usual construction.

In the form shown, the grate 12 is of the revolving mushroom type supported at the center on an upright finger 12$^a$ carried on a cross support 12$^b$ and normally shaken down by oscillating the grate through a suitable rod 14. It will be understood, however, that this specific type of furnace is shown merely as a means of illustrating my invention, and that my improved device can, with slight modifications, be applied to a wide variety of coal or coke burning furnaces adapted either for domestic use or in steam generating plants or the like.

As shown in the drawings, my improved stoking device is constructed as an attachment to be applied as a unit to a domestic furnace, but it will be manifest that it can be built as an integral unit, if so desired.

When constructed as an attachment, I provide a standard or base indicated generally at 17, made up of a plurality of horizontally extending frame members 18, 19, and 20, said frame members projecting at various angles from a center hub 21 and having upright supporting legs 18ª, 19ª, and 20ª at their outer ends, respectively.

Figure 1:
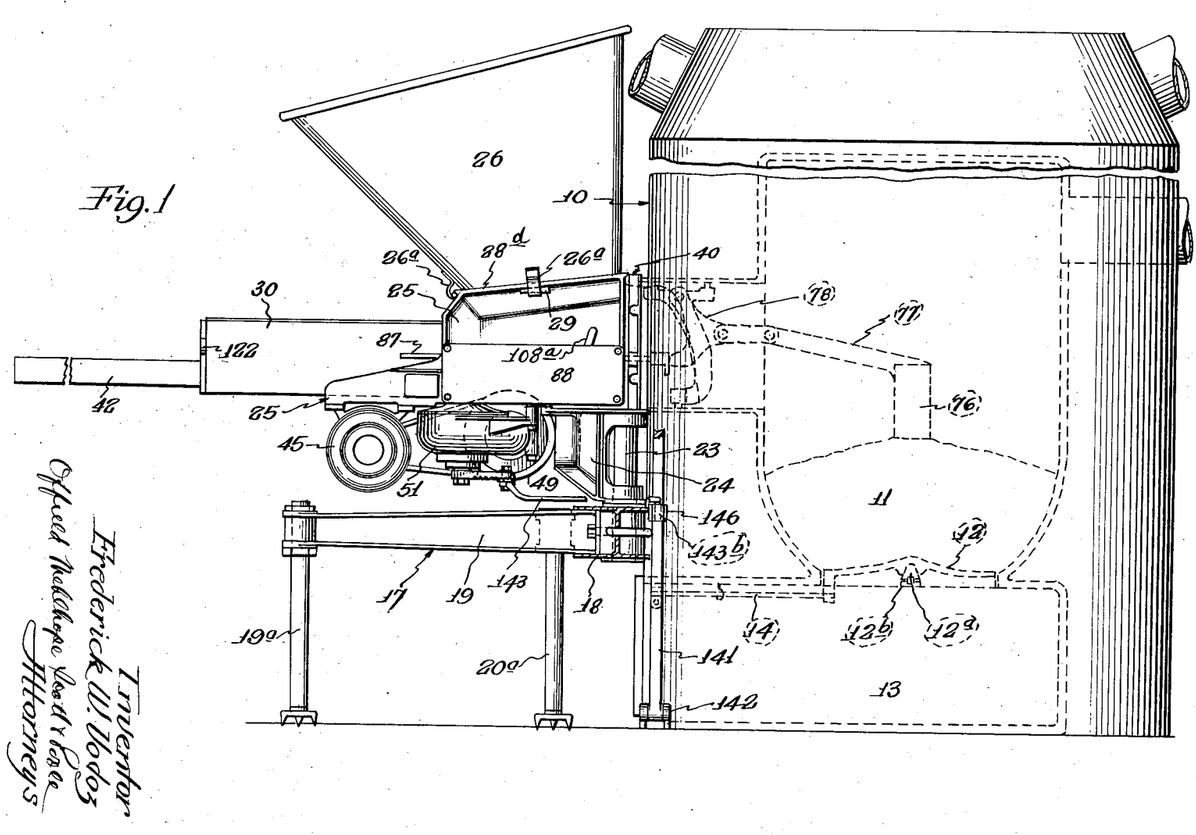
Figure 1 is a side view of a furnace of the ordinary household type to which my invention has been applied as an attachment, but with parts of the support and shaker means broken away.
Figure 2:
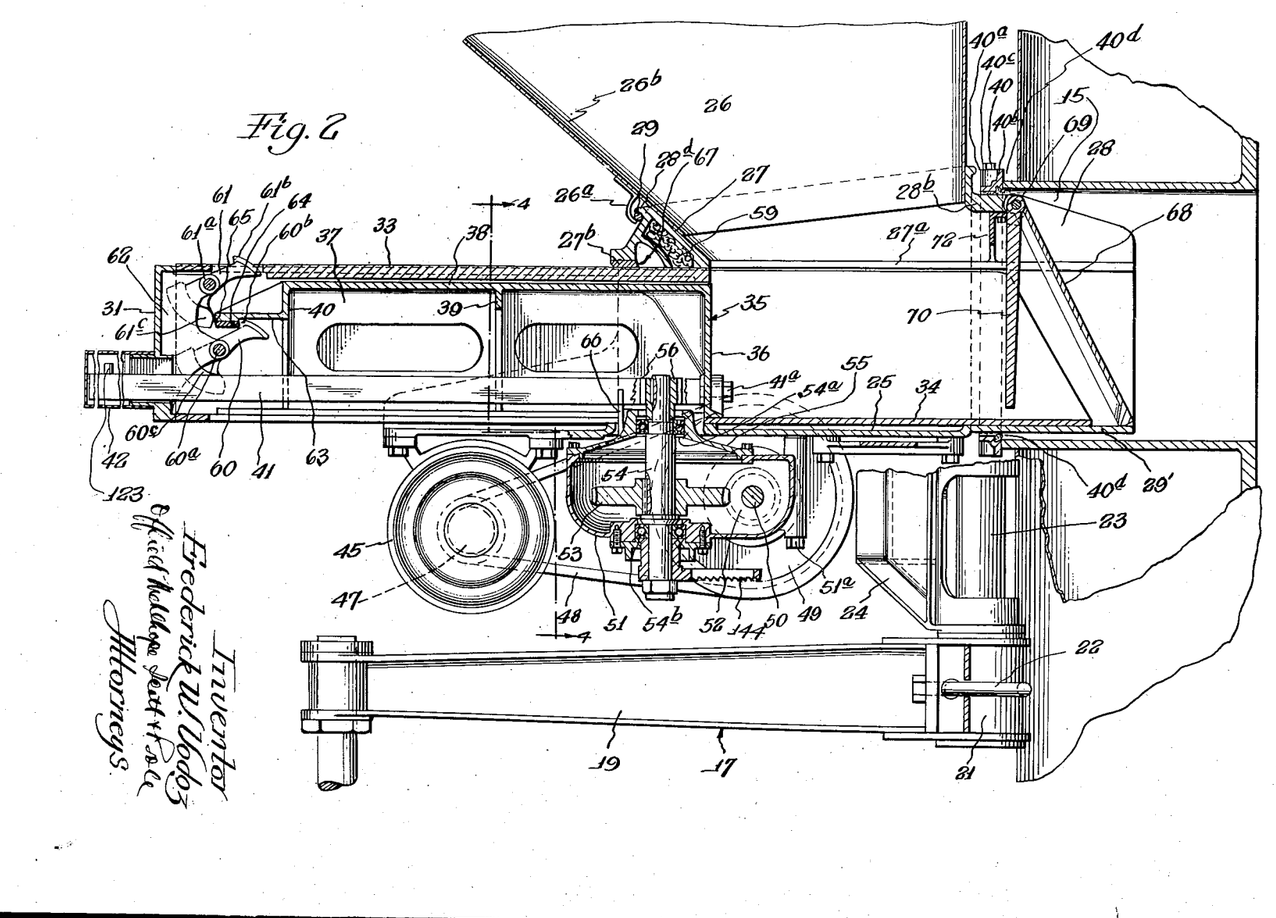
Figure 2 is an enlarged fragmentary detail view of the device shown in Figure 1, but with parts broken away and shown in section to show details of the operating mechanism and with the feeding device in retracted or inoperative position.

In the form shown, the horizontal frame members 18 and 20 are in substantial alignment with each other and are positioned adjacent and across the front of the furnace, while the frame member 19 is preferably pivotally connected to the central hub 21 by means of U-bolt 22 as shown in Figures 1 and 2 so as to permit the rearwardly extending frame member 19 with its leg 19ª to be swung in a horizontal plane and adjusted at several angles relative to the furnace, and thus accommodate itself to obstructions such as supporting posts and the like, which may be positioned adjacent the front of the furnace.

Supported on the base 17 through and above the hub portion 21 is a pivot pin 23 upon which is carried a main supporting bracket 24. This supporting bracket is connected to and forms a part of the main casing 25 of the stoking mechanism, the arrangement being such that the entire stoking mechanism is supported on the bracket 24 so as to be swung as a unit on the upright pivot pin 23. As will be seen from Figures 3 and 5, the hub portion 21 and pivot pin 23 of the base frame 17 are disposed at one side of the fuel supply opening or fire door 15, while the stoking mechanism is mounted on the supporting bracket 24 so as to be in registering engagement with said furnace opening when in operative position.

Figure 5:
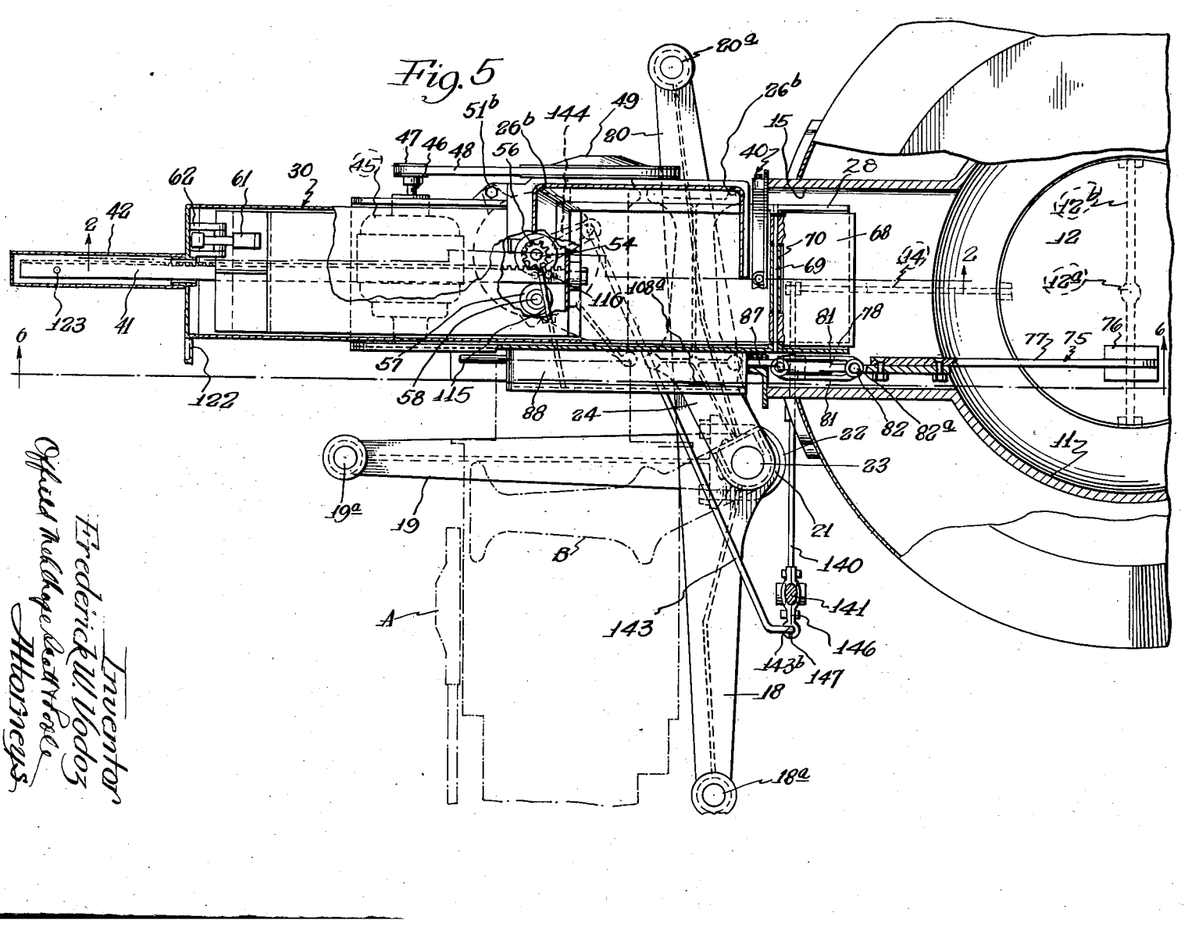
Figure 5 is a sectional plan view taken on a line extending in a generally horizontal direction above the feeding ram, but with parts broken away to show the portions of the operating mechanism.

In Figure 5 the dotted lines A and B indicate the position of the feeding mechanism and supporting bracket, respectively, when the latter are swung as a unit on the pivot pin 23 so as to be fully removed from the furnace opening and arranged in a position at substantially right angles to the latter.

The front or inner end of the casing 25 has an elongated portion that extends in fitting engagement within the fire door opening 15 and consists of a flanged upper plate 28ᵇ, forwardly projecting side plates 28, 28 and bottom plate 29, as is best shown in Figure 2. When in closed position against said fire door, the portions of the casing are sealed by means of a frame 40. Said sealing frame consists of a longitudinal flange 40ª and a laterally extending flange 40ᵇ. The entire frame is adjustable longitudinally of the front end of the casing by means of set screws 40ᶜ, 40ᶜ which extend through the longitudinal flange 40ª to engage the adjacent sides of the casing 25. The laterally extending flanges 40ᵇ may thus be adjusted so as to fit closely against the outer margin of the fire door opening 15 when the apparatus is in closed position, as shown in Figure 2. Suitable packing means such as cement may be inserted between the frame 40 and the sides of the casing as indicated at 40ᵈ.

Figure 4:
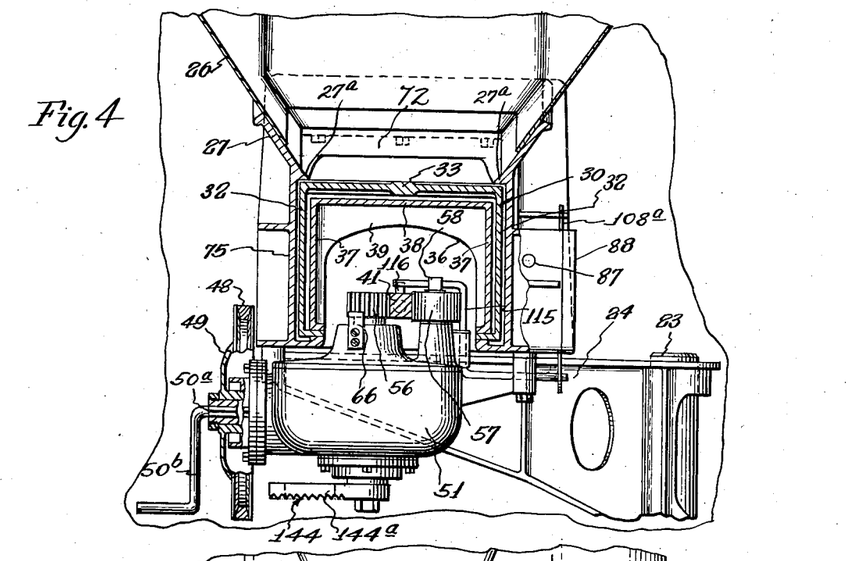
Figure 4 is an enlarged transverse section taken on line 4—4 of Figure 2.

Referring now to details of construction of the stoking mechanism, the main casing 25 has mounted thereon a hopper 26 mounted on a downwardly extending discharge spout or passageway 27 opening into the forward end of said casing, that is to say, the end nearest the furnace. In the form shown, said discharge spout 27 is integral with the casing as shown in Figure 4, and the hopper is detachably secured thereto.

A plurality of lugs 26ª fit over a bead 28ᵈ on the outer margins of the spout, and a wedge pin 29 is driven between each of said lugs and head, as clearly shown in Figures 1 and 2.

The hopper 26 and the connecting portions of the discharge spout 27 of the main casing are preferably formed with corners having fillets of substantial radius as indicated at 26ᵇ, 26ᵇ on Figure 5, which is found to be particularly advantageous in insuring free downward flow of the fuel into the casing.

Mounted within the main casing 25 and slidable longitudinally thereof is a hollow shovel member 30 consisting of side walls 32, 32, a rear wall 31, a top wall 33 and a bottom wall 34. Said top wall 33 extends over the rear portion of the shovel to a point approximately midway the length of the latter, as best shown in Figure 2, while the bottom wall begins at a point approximately opposite the front margin of the top wall 33 and extends forwardly to the front edge of the shovel.

As will be seen from Figure 2, the top wall 33 of the shovel is retracted beyond the discharge opening 27 of the hopper when the shovel is in its rearmost position. The entire shovel, however, is slidable longitudinally within the casing 25 so as to be moved forwardly toward the fire box, with the bottom plate 34 of said shovel sliding along the bottom plate 29' and the top wall 33 sliding beneath inwardly extending guides 27ª, 27ª formed along opposite sides of the upright plates 75, 75.

Telescopically mounted within the shovel is a ram 35 consisting of an upright ejector plate 36, side plates 37, 37 and a top plate 38. The top and side plates are strengthened by an intermediate transverse web 39 and a similar web 40 at the rear end of said ram. The central portion of the ram is hollow except for a longitudinally extending rack bar 41 which is attached adjacent the bottom edge of the ejector plate 36 by suitable means such as bolt 41ª and extended rearwardly beyond the main body of the ram and through the rear end wall 31 of the shovel. A hollow guard member 42 is mounted on the rear of said shovel end wall so as to enclose the projecting rear end of the rack bar 41 when it extends beyond said end wall.

The power drive means for the shovel and ram consists of a reversible electric motor 45 suitably mounted on the casing 25, and in the form shown in Figures 1 to 7 being suspended beneath the under side of said casing adjacent the outer end thereof. Said motor has a transversely disposed armature shaft 46 and pulley 47 about which a belt 48 is trained to engage with a pulley 49 on transverse shaft 50. The shaft 50 has bearing in a gear case 51 also suspended beneath the main casing 25 and connected thereto by suitable means such as bolts 51ª, 51ᵇ. A worm 52 is fixed on the shaft 50 within the casing 51, said worm engaging a worm wheel 53 on an upright shaft 54 having suitable bearing within said casing as by means of anti-friction roller bearings 54ª and 54ᵇ at the upper and lower ends of said casing, as best shown in Figure 2. The shaft 50 may be provided with a squared socket 50ª at one end, so as to accommodate a detachable hand crank 50ᵇ for manual operation of the mechanism, in case of emergency, as indicated in dotted lines in Figures 3 and 4.

For convenience in assembly and accessibility, the upper anti-friction roller bearing 54ª is carried in a cover plate 55 detachably mounted on the upper end of the casing 51. At the upper end of the upright shaft 54 above the cover plate 55 is fixed a pinion 56 which has toothed engagement with the rack 41 forming a part of the ram 35 as aforesaid. A guide roller 57 is mounted on an upright stud 58, and engages the rear side of the rack bar opposite the pinion 56.

Means are provided for moving the shovel and ram forwardly by power to feed the fuel and spread it on top of the fire, and returning said shovel and ram by reversing the motor 45. In the form shown herein, the ram and shovel are connected for simultaneous movement during a part of their forward stroke, until the shovel is moved inwardly to a position where the fuel is discharged over the center of the firebed, whereupon further movement of the shovel ceases but movement of the ram continues so as to eject the charge of fuel within the forward end of the shovel upon the fire. This connecting mechanism also includes means for automatically holding the shovel in its forward position until the ram has been returned to its initial position relative to said shovel, whereupon the ram picks up the shovel and both elements return to their initial or starting position.

Figures 7, 9, 11, 25:
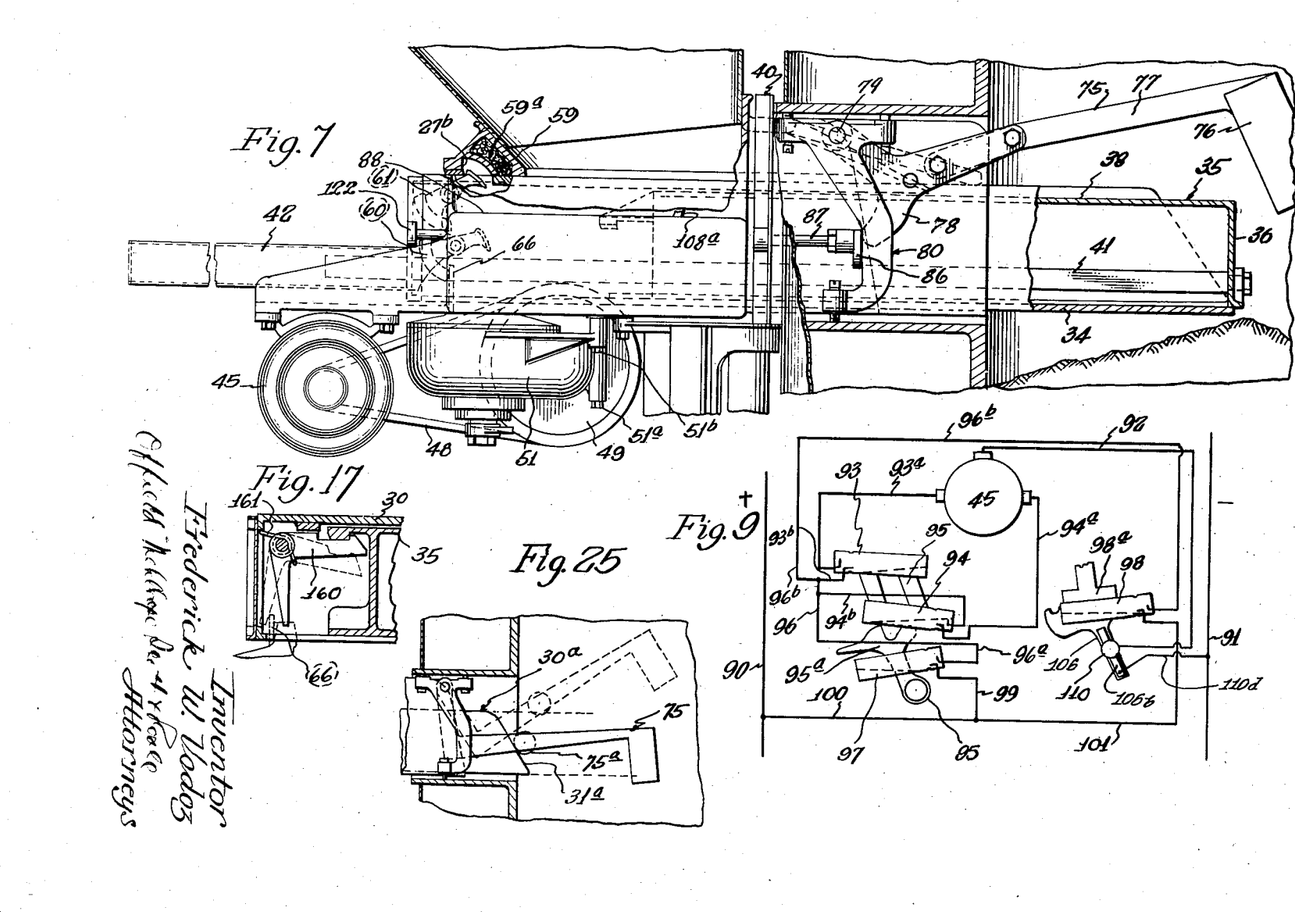
Figure 7 is a view somewhat similar to Figure 6, but showing the feeding shovel and ram in their forwardmost or discharging position.
Figure 9 is an electric wiring diagram showing the arrangement of the control switches and circuit connections with the feeding motor.
Figures 10, 11, 12, and 13 are diagrammatic views of the control mechanism shown in detail in Figure 8 indicating the positions of the respective parts during several stages of the cycle of feeding operation of the apparatus, as will more fully be described.
Figure 25 is a diagrammatic view showing a modified form of feeding mechanism including means co-operating between the shovel and the contact control arm for raising the latter while the shovel is moved into fuel discharging position over the fire bed.

In the form shown in Figures 2, 5, and 7, this connecting means comprises two pawls 60 and 61 pivotally supported on pins 60ª and 61ª, respectively, on an inwardly supporting bracket 62 immediately forward of and connected to the rear wall of said shovel. Said pawls are provided at their upper ends with rearwardly facing detents 60ᵇ and 61ᵇ and are counter-balanced by weights 60ᶜ and 61ᶜ, respectively, so as to tend to swing their respective detents in upward position.

A projecting bracket 63 is supported at the rear end of the ram 35, said bracket having a forwardly facing shoulder 64 which is normally adapted to have engagement with the detent 60ᵇ of the lower pawl 60. When so engaged it will be observed that the pawl 60 is held in forwardly inclined position as clearly shown in Figure 2. The bracket 63 also has a rearwardly facing shoulder 65 adapted normally to engage the counterweight 61ᶜ of the upper pawl 61 so as to hold said pawl in a generally forwardly inclined position substantially parallel to the lower pawl 60 as also shown in Figure 2.

The engagement between pawl 60 and the bracket 63 carried by the ram is such that forward movement of the ram produced through rotation of the pinion 56 on rack 41 causes the shovel to be carried forward with the ram until the lower pawl is tripped by a stop 66 which is fixed to the casing 25, and projects upwardly into the path of movement of the counterweight 60ᶜ of said pawl.

Thus when the pawl 60 is carried forwardly so as to engage the counterweight 60ᶜ with the stop 66, the detent 60ᵇ is swung downwardly out of engagement with the shoulder 64, thereby unlocking the driving connection between the ram 35 and the shovel 30, and permitting the ram to continue its forward movement while the shovel remains stationary. Just before this unlocking action occurs, the upper end of detent 61ᵇ carried by the upper pawl 61 passes beneath the bearing plate 27ᵇ on the main casing, and assumes a position forwardly of upright shoulder 67. This locks the shovel against rearward movement relative to the casing so that during the initial retractive movement of the ram the shovel remains stationary until the pawl 61 becomes unlocked by engagement of the counterbalance 61ᶜ by upright shoulder 65 carried by the bracket 63 at the rear end of said ram.

It will be noted that the top plate 33 of the shovel 30 forms in effect a partial closure of fuel valve as it is moved forwardly beneath the discharge passage of the fuel hopper 26. Moreover, when the ram 35 is moved forwardly of said shovel top plate, the top plate 38 of said ram forms an extension of said shovel top plate, and also keeps particles of fuel from falling behind the upright plate 36 of said ram and fouling the operation of the mechanism.

The co-operative relation of the parts just described with respect to the control devices for automatically starting the motor and reversing its direction of rotation at the extreme forward limit of movement of the ram, will hereinafter more fully appear.

Immediately forward of the bearing plate 27ᵇ I provide a chamber 59, opening downwardly upon the top plate 33 of the shovel. This chamber is filled with a suitable packing material 59ª such as asbestos fibre, which serves to wipe fuel dust from the upper surface of the shovel as it passes back and forth in its feeding strokes.

In order to protect the unburned fuel disposed in the shovel and hopper from excessive heat before it is fed forwardly into the fire box, I provide a plurality of baffle means or doors adjacent the front end of the main casing 25 where it extends into the fire door. In the form shown, said baffle means comprise an outer door 68 hinged on transverse pin 69 supported between the side plates 28, 28 just within the fire door opening 15. Said door is adapted to fit closely between the side plates 28, 28 and when in closed position is inclined at a forwardly extending angle so as to engage the forward edge of the bottom plate 29 as clearly shown in Figures 2 and 5. A second door 70 is also hinged on the pin 69, this second door being slightly narrower than the outer door 68 and arranged so as to depend between the side walls 32, 32 of the shovel 30 when the latter is in retracted position, as shown in Figure 2. The door 70 is relatively heavy and massive so as to tend to be swung downwardly by gravity against the fuel deposited within the shovel, so as to form an open space between the said shovel and the outer door 68 as clearly shown in Figure 2.

In connection with the discharge passage between the side plates 28, 28, I also find it desirable to provide a flanged web 72 projecting downwardly from the upper plate 28ᵇ of the casing 25 which projects into the fire door 15, said web extending across the upper part of the space between said plate and the upper margin of the shovel and arching down to the shovel guides 27ª, 22ª, as clearly shown in Figure 4. This web limits the size of the fuel discharge opening, but with substantial clearance above the shovel, thereby restricting the amount of fuel that can be carried forward on the shovel, but eliminating shearing of the fuel at the top of the shovel. After the fuel has passed the web 72, much of the lateral pressure is relieved so that it is passed forwardly through the baffle plates 68 and 70 without danger of jamming the latter.

The means for automatically controlling the operation of the feeding mechanism is of the same general type as disclosed in my prior applications bearing Serial No. 318,662 filed November 12, 1928, Patent No. 1,863,677 and Serial No. 447,154 filed April 25, 1930, Patent No. 1,984,852 wherein a floating control member is mounted so as to extend above and in contact with the fire bed within the fire box. The arrangement is such that when the top of the fire burns down to a predetermined point, the contacting control member drops with the fire bed until a point is reached where the refueling operation is started automatically. During the feeding operation the contacting control member is automatically raised so as to permit the new charge of fuel to be placed upon the bed without interference with said control member.

Figures 6, 26:
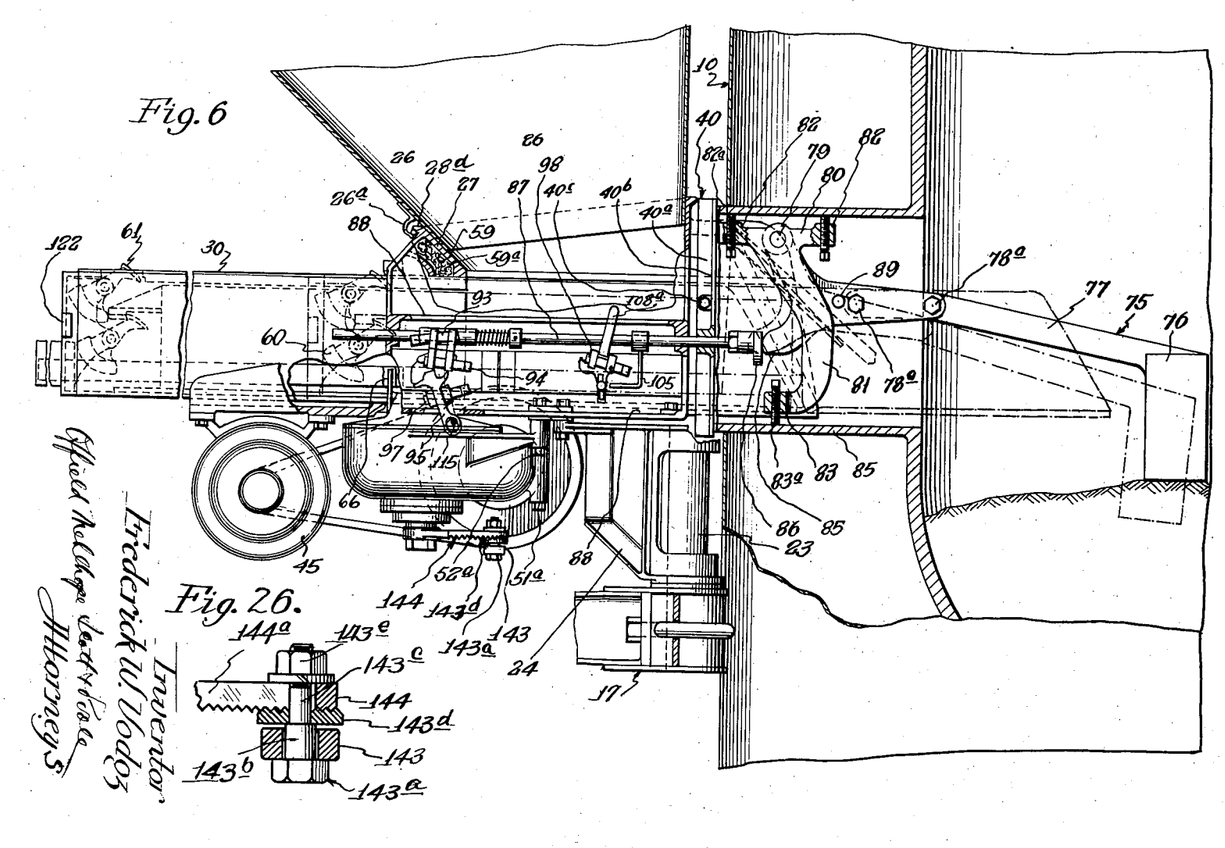
Figure 6 is an enlarged detail view taken generally on line 6—6 of Figure 5 showing details of the control mechanism with the feeding shovel and ram in their retracted or inoperative position.
Figure 26 is a detail of the shaker rod adjusting device.

In the improved form of control mechanism shown herein, the weighted contact member 75 is detachably mounted in the fire door opening 15 independently of the other parts of the mechanism. Said contact member consists of a piece of fire brick 76 which depends in upright position from an arm 77 extending into the fire box, so that the lower end of the fire brick may rest upon the fire preferably adjacent the center thereof, but to one side of the path of travel of the shovel 30. (See Figs. 1, 5, and 6.) The arm 77 is rigidly connected to a support 78 by bolts 78ᵃ, 78ᵃ. Said support is hinged on pin 79 having bearing at opposite ends in a bracket 80 which is detachably mounted within and at one side of the door opening 15. The bracket 80 consists of a pair of laterally spaced plates 81, 81 extending in vertical position and spanning the pivoted end of the swinging support 78. The upper ends of the bifurcated plates 81, 81 meet in a pair of bosses 82, 82 which have set screws 82ᵃ, 82ᵃ extending upwardly therethrough for engagement with the roof of the fire door opening 15. The lower ends of the plates 81 are joined together in a similar boss 83 having a set screw 83ᵃ extending therethrough for engagement with the lower wall of the fire door opening 15. This construction is best shown in Figures 5 and 6. The arrangement is such that the floating control member 75 with its pivotal supporting bracket 80 may be detachably mounted in the proper position within the fire door opening with adjustments for variations in sizes of fire doors, and the main casing 25 can be swung away from the fire door opening without disturbing the control member 75.

The supporting member 78 is provided with a laterally projecting lug 89 which engages one of the upright plates 81 to limit the downward swinging of the control arm 77, thereby facilitating the starting of a new fire.

The supporting member 78 of the floating arm is provided with an outwardly projecting spur 85 which is adapted to engage a shoe 86 carried on the forward end of a control rod 87 which extends through the adjacent flanged portion of the sealing frame 40 and into the controller casing 88 formed at one side of the main casing 25.

Figure 8:
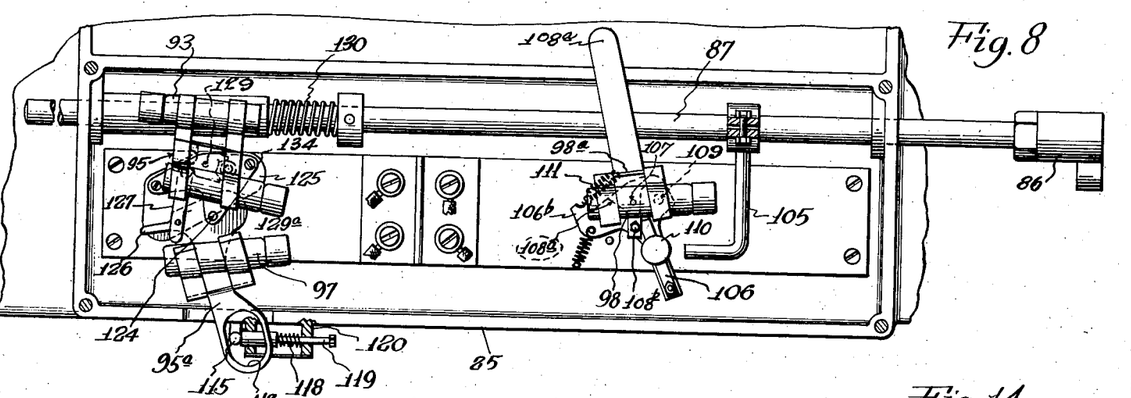
Figure 8 is an enlarged detail view of the control box showing the electric switches mounted therein.

The switch mechanism for automatically controlling the starting, reversing and stopping of the motor which drives the feeding shovel 30 and ram 35 is for the most part located within this controller casing 88. Details of one form of this mechanism are shown in Figure 8, the wiring diagram of the said mechanism is shown in Figure 9, and working diagrams of the operating positions of said mechanism are shown in Figures 10 to 13, both inclusive.

The several circuit connections are controlled through a series of switches of the well known mercury tube gravity type, mounted within the casing 88. In the form shown herein, each of said mercury tube switches is of the usual form, consisting of an evacuated tube having spaced terminals at one end thereof, and a small amount of fluid mercury in said tube arranged to close the circuit between said terminals when the tube is tilted with the terminal end downwardly and the mercury flows by gravity to contact both terminals. The circuit connections for these switches are shown in Figure 9, as follows:

The main power supply lines for the motor 45 are indicated at 90 and 91. One side of said motor is connected to one of the power lines, as for instance line 91 by conductor 92. Conductor 92 includes an automatic time limit switch 110 as will hereinafter be described. Two conductors 93ᵃ and 94ᵃ are connected to the motor for driving the latter in reverse directions. The conductor 93ᵃ leads to one terminal at the end of a mercury tube switch 93, and the conductor 94ᵃ leads to one terminal at the end of a mercury tube switch 94. The two tube switches 93 and 94 are mounted substantially parallel with each other on a common rocking carrier 95 but the terminal ends of said mercury tubes are arranged in oppositely extending directions on said carrier so that when one switch is rocked into the proper position to close the circuit at the terminal end thereof the other switch will be rocked into the opposite, or open position, and vice versa. The second terminals of the switches 93 and 94, respectively, are connected by conductors 93ᵇ and 94ᵇ to a common conductor 96 which has one branch 96ᵃ leading to one terminal of a mercury switch 97 and another branch 96ᵇ leading to one terminal of a mercury switch 98. The second terminal of switch 97 is connected through conductors 99 and 100 to the main supply line 90, while the second terminal of mercury switch 98 is likewise connected to the last named power supply line through conductors 100 and 101. It will thus be seen that the mercury switches 97 and 98 are arranged to be in parallel with each other when closed.

The mercury switch 97 is mounted on rocking carrier 95ᵃ co-operatively connected with the carrier 95 on which the reversing switches 93 and 94 are mounted, and serves to carry the operating circuit after the feeding mechanism has begun its forward stroke and the starting switch 98 has been rocked into open position, as will hereinafter more fully appear. The switch 97 is, for convenience, hereinafter referred to as the "carry-over" switch.

The switch 98 is mounted on a rocking carrier 98ᵃ and is mechanically controlled to start the forward feeding movement, as will hereinafter appear. Said switch is, for convenience, hereinafter referred to as the "starting" switch.

In the form shown, the cariers 95 and 95ᵃ are mechanically connected by means of a snap switching device so that when the lower carrier 95ᵃ is rocked in one direction, the upper carrier will be automatically rocked in the other direction, and vice versa. This mechanism is shown in detail in Figures 20, 21, and 22.

Figures 20, 21, 22:
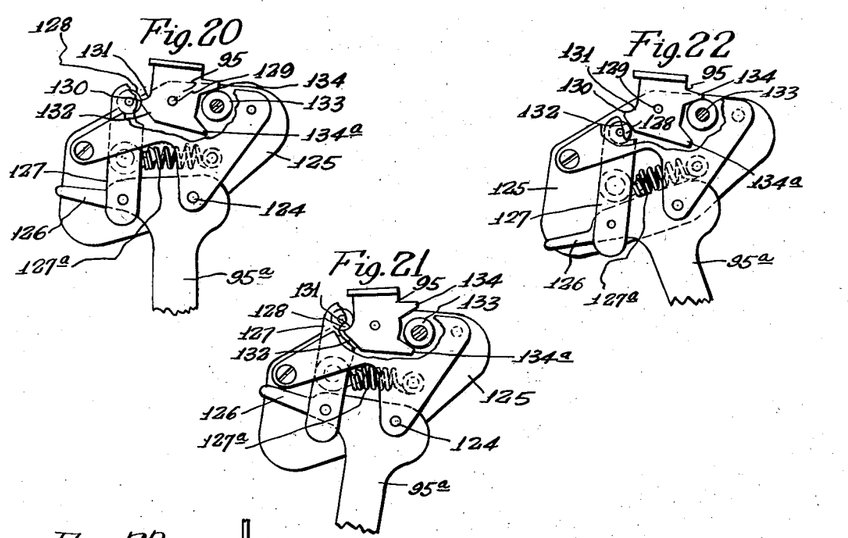
Figures 20, 21, and 22 are detailed views showing the snap switch action for the reversing and carry-over control switch carriers.

The lower carrier 95ᵃ forms the actuating connection for the mechanism, being operated by trip lever 115 at certain periods of the operating cycle, as will hereinafter more fully appear. Said lower carrier is pivotally mounted on a pin 124 fixed on a base plate 125. Said carrier has a lateral extension 126 to which is pivotally connected an upwardly extending link 127. Said link has a roller 128 at its upper end adapted to have engagement with one side of the upper carrier 95 which is pivotally mounted on pin 129. The side of said upper carrier is formed with a projection 130 and adjacent inclined surfaces 131 and 132 above and below said projection as clearly shown in these figures. The roller 128 is urged by tension against one or the other of these coacting surfaces by means of a spring 127ª connected to the link 127.

The range of rocking movement of the upper carrier 95 is limited as by a pair of shoulders 134, 134ª which engage opposite sides of a stop 133 mounted on the base plate 125.

The arrangement of the switch mechanism above described is such that when the lower carrier 95ª is thrown to the extreme right, as seen in Figure 22, the roller 128 engages the lower inclined surface 132 and urges the upper carrier in a clockwise direction with the upper shoulder 134 engaged against the stop 133. As the lower carrier 95ª is shifted toward the left, the position of the upper carrier is unchanged, as the roller moves outwardly against the tension of the spring along the under inclined surface 132, until a point is reached adjacent the extreme left-hand position of the carrier 95ª when the roller passes over the projection 130 (see Fig. 20). At the instant this occurs, the upper carrier 95 is quickly rocked in a counter-clockwise direction, due to the pressure of the roller on the upper inclined surface 131, thereby shifting the mercury tubes 93 and 94 into reversing position, as shown in Figure 21. When, at a later period in the cycle of operation, the lower carrier 95ª is shifted toward the right, the roller 128 moves downwardly along the upper inclined surface until it passes over the projection 130, whereupon the upper carrier 95 is swung back in a clockwise direction. It will be seen from the following description that the shifting of the reversing mercury switch tubes is accomplished instantaneously with a snap action at the extreme forward and rearward positions of the lower carrier 95ª through action of the trip lever 115 connected thereto.

Referring now to Figure 8, the parts are shown with the shovel and ram at rest and all parts in non-operative position. The control rod 87 is pushed toward the furnace because control arm 75 is supported by a sufficient charge of fuel in the fire box. In this position both the starting switch 98 and the carrying switch 97 are held in open position so that no current is supplied to the motor.

The control rod 87 has a depending finger 105 thereon which is adapted to engage a projecting portion 106 of the starting switch carrier 98ª. The carrier 98ª is made up of two parts, the upper part 108 being pivoted to the lower part 106 by pivot pin 107, while the lower part is in turn pivoted to the switch panel 88ª by pivot pin 109. Under normal operating conditions the upper and lower parts of the carrier are held in fixed relationship so as to rock as a unit on the pivot pin 109. An automatic time limit switch to be later described is provided so as to cut off the operating current automatically after the feeding mechanism has been in operation for an excessive period of time.

Figure 10:
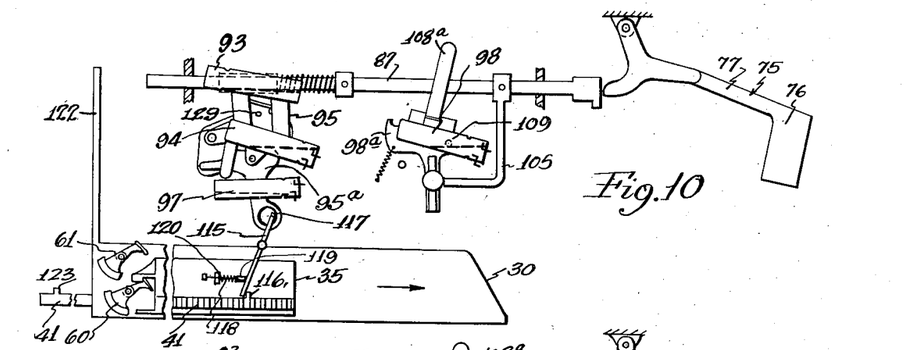
Figure 11:
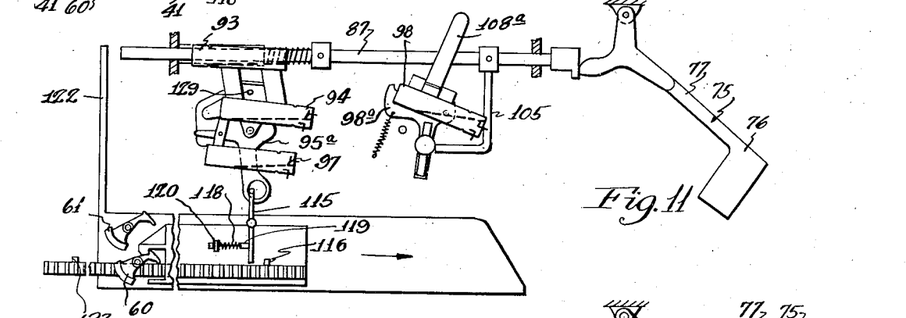

In the usual or normal operation of the starting switch, the control rod 87 is responsive to movements of the control arm 77, and as the latter drops with the fire bed, the depending finger 105 moves into engagement with the lower part 106 of the starting switch carrier, and slowly rocks said carrier bodily on its pivot 109 until a position is reached as shown in Figure 10, when the starting switch 98 becomes closed. Referring to the circuit connections in Figure 9, it will be seen that current is then supplied from power line 90 through conductors 100 and 101, starting switch 98, conductors 96ᵇ and 94ᵇ, mercury switch 94, conductor 94ª to the motor 45, and thence through conductor 92, time limit switch 110 to the other power line 91. This circuit connection starts the motor in a direction to move the shovel 30 and ram 35 toward the fire box as indicated by the arrow in Figure 10. As will be seen from this figure, both the reverse switch 93 and the carry-over switch 97 are in open position, the carriers 95 and 95ª having been forced into this position during the final retractive movement of the ram 35 by means of a trip lever 115, the lower end of which is engaged by a stop 116 carried adjacent the inner end of rack 41, while the opposite end of said trip lever is engaged within a loop 117 formed in the lower end of the carrier 95ª (see also Figure 8). A tension spring 118 on plunger 119 engages a shoulder 120 fixed on the main casing 25 and tends to urge said plunger against the trip lever 115. Said spring 118 is arranged to be placed under compression during the time that the stop 116 moves to its rearwardmost position, as shown in Figure 10.

As soon as the motor starts the ram 35 forwardly, the stop 116 is carried therewith so as to permit the stored energy in spring 118 to rock the upper end of trip lever 115 to an intermediate position shown in Figure 11, thus rocking the lower carrier 95ª rearwardly a sufficient distance to throw the carry-over switch 97 into closed position. Said carry-over switch being in parallel with the starting switch as previously described, the operating current may then flow through the carry-over switch and its associated conductors for operating the motor through an entire cycle comprising the forward and rearward strokes of the ram and shovel.

Figure 12:
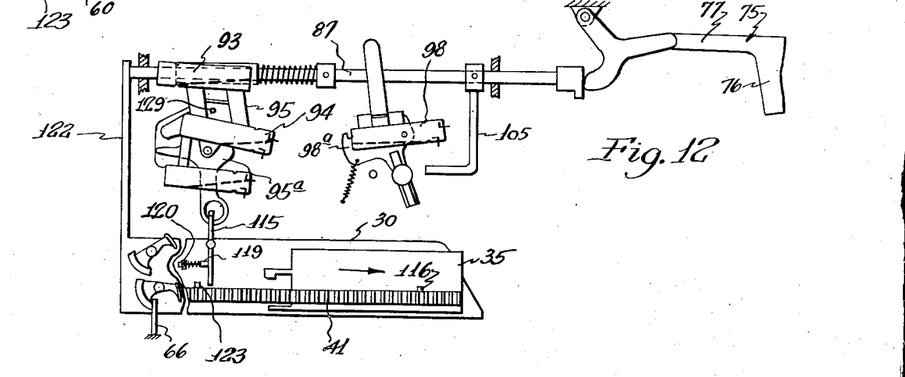

The carry-over switch serves the important function of continuing the circuit connections through the motor during that period of time when the shovel 30 approaches and leaves its extreme position of inward or feeding movement as indicated in Figure 12. At this point in the cycle, an upright lug 122 on the rear end of said shovel engages the rear end of control rod 87 so as to push said rod forwardly and bodily lift the control arm 75 from the fire so as to permit the fuel to be fed upon the top of the fire without interference from said control arm. In this position it will be seen that the finger 105 carried by control rod 87 is moved out of engagement with the starting switch carrier 98ª so that said switch is swung into open position during the brief period that the control arm 75 is elevated above the fire in the manner described.

Figure 13:
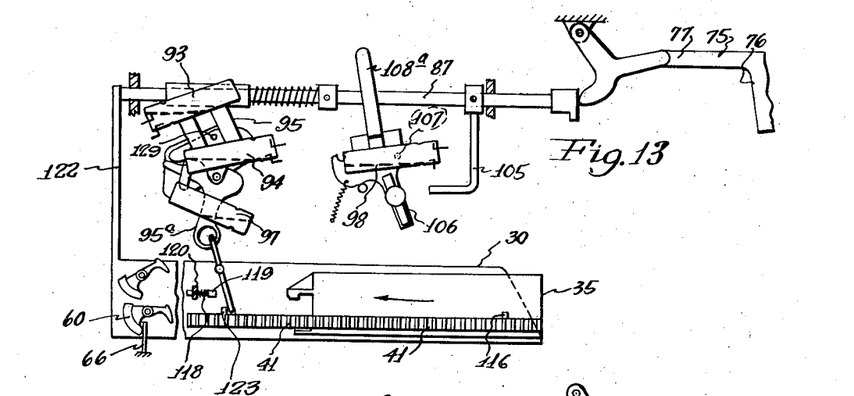

As the ram approaches its extreme forwardmost position as shown in Figure 12, a stop 123 on the rear end of the rack 41 comes into engagement with the trip lever 115 and rocks the carrier 95ª to its extreme rearward position as shown in Figure 13. By reason of the automatic snap switch connection between the upper and lower carriers previously described, the upper carrier 95 is rocked by a quick action into a reversely inclined position, as shown in Figure 21. This rocking movement of the upper carrier 95 causes the forward operating switch 94 to be opened while the reverse switch 93 is simultaneously closed. It may be observed that during this movement of the lower carrier 95ª the carry-over switch 97 is tilted a bit more, but without affecting the closed contact between its terminals.

With the switches 93 and 94 in reverse position shown in Figure 13, reference to the wiring diagram of Figure 9 shows that the circuit connections to the motor will be such as to drive the latter in reverse direction through the reverse switch 93 and its associated conductors 93ª and 93ᵇ instead of through the switch 94 and its associated conductors 94ª and 94ᵇ. By this time the ram 35 will have discharged the entire charge of fuel from the shovel 30 and said ram will be moved rearwardly to its initial starting position as shown in Figure 8.

As the ram approaches its rearwardmost position shown in Figure 10, the stop 116 on rack 41 engages the trip lever 115 and the latter swings the lower carrier 95ª forwardly so as to rock the carry-over switch 97 into open position. At the same instant the upper carrier 95 is rocked to its forwardmost or starting position, as shown in Figure 8. Some time before this initial position has been reached, however, the lug 122 on shovel 30 has been moved rearwardly out of engagement with the control rod 87, thus permitting the contact control arm 75 to resume its position on top of the fire bed.

In the event that a sufficient amount of fuel has been deposited upon the fire bed to bring it up to its normal height, the control arm will be supported and maintained on said bed, and a coil spring 130 which normally tends to urge the control rod 87 forwardly, will operate to move the lever 105 out of engagement with the starting switch carrier 98ª, as shown in Fig. 8. Thus when the ram reaches its outermost or initial position as shown in Figure 8, and a sufficient charge of fuel has been added to the fire, the starting switch 98 will be open so that the motor circuit will be broken at the instant the carry-over switch 97 is snapped into open position.

It will be observed further, however, that in the event that the charge introduced during a single feeding cycle of the shovel and ram is insufficient to provide support for the control arm at a predetermined height as it is lowered into contacting position upon the top of the replenished fire bed, the starting switch 98 will remain closed at the end of the cycle, (although the carry-over switch 97 is open at this instant). Said starting switch will thereupon serve to continue the operation of the motor through as many cycles as are necessary to replenish the fuel to a point where the control lever 77 is supported at the proper height.

Figure 23:
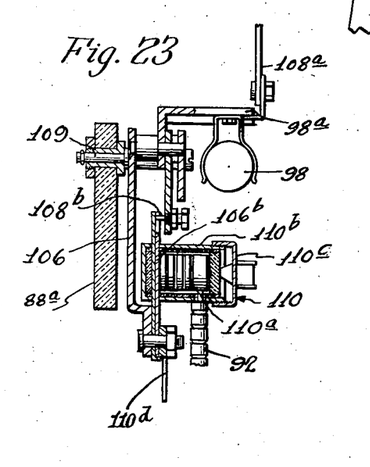
Figures 23 and 24 are enlarged detail views showing the starting switch carrier and automatic time limit switch.
Figure 24:
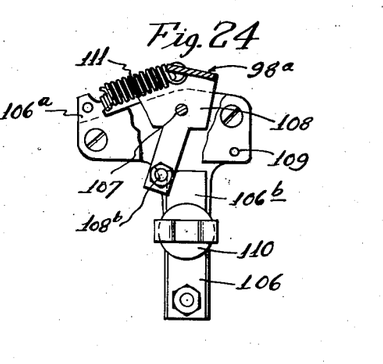

The automatic time limit switch 110 is shown in detail in Figures 23 and 24 and consists of a carbon pack 110ª in series with the main operating circuit, as shown in Figure 9. Said carbon pack is mounted in an insulated casing 110ᵇ, and is maintained under pressure of threaded cap 110ᶜ against a bi-metal strip 106ᵇ, secured to the lower part 106. The free end of said strip is normally arranged in the path of stop 108ᵇ depending from the upper part 108. A tension coil spring 111 is connected between an offset portion 106ª of part 106 and the upper part 108 of switch 98, said spring being arranged to urge and normally hold the depending stop 108ᵇ against the strip 106ᵇ.

In the event that the main circuit connections from 91 through conductor 110ᵈ, strip 106ª, carbon pack 110ª and conductor 92 have been closed for an excessive period of time, the heat generated in the carbon pack 110 is sufficient to bend the bi-metal strip 106ᵇ out of engagement with the stop 108ᵇ, thus permitting the upper part 108 and the starting switch 98 carried thereon to be rocked by the coil tension spring 111 into open position, thereby automatically shutting off the operating circuit, regardless of the position of the control rod 87 and the lower part 106 of the carrier. Of course, as soon as the carbon pack is cooled again, the parts will resume their normal operating positions.

It will be understood, of course, that the preceding description is mainly directed to the operation of the starting, carry-over and reverse switches for operating the motor, and no reference has been made to the co-operative connections between the ram and the shovel through the medium of the pawls 60 and 61. These co-operative connections, however, have been previously explained in connection with the detailed description of the shovel and ram, and their relative positions during the operation of the several switches will be understood by reference to Figures 10 to 13.

In order to maintain a fire bed of uniform characteristics with the automatically controlled fuel feeding mechanism above described, I find that it is also important to provide means for automatically discharging the ashes from the bottom of the fire. Otherwise if the ashes were permitted to accumulate at the bottom of the fire box, the depth of the fire bed would be gradually diminished until the fire is choked out. It is manifest, therefore, that in order to insure a continuously operating device, it is necessary to insure a periodical shaking down of the fire in timed relation with the addition of fuel to the top of the bed.

In the form shown, the grate 12 is arranged to be shaken down automatically each time fuel is added to the fire. For this purpose the shaking rod 14 of the grate is connected by a laterally extending link 140 to an upright shaking lever 141 suitably pivoted on a bracket 142 and arranged in a convenient position, as usual, for shaking down the fire by hand. A detachable connecting rod 143 is provided between the lever 141 and a crank arm 144 fixed on the lower end of the upright shaft 54 which also carries the driving pinion 56 for the feeding rack of the ram 35. The connecting rod 143 is preferably provided with means for longitudinal adjustment in slot 144ª of the crank arm 144, this adjusting means herein consisting of a bolt 143ª having an enlarged end 143ᵇ upon which the connecting rod 143 is pivoted. A reduced portion 143ᶜ passes through a serrated washer 143ᵈ and together with said washer is adjustable longitudinally of the slot 144ª and clamped to the arm 144 by nut 143ᵉ, as shown in Figure 26.

Figure 3:
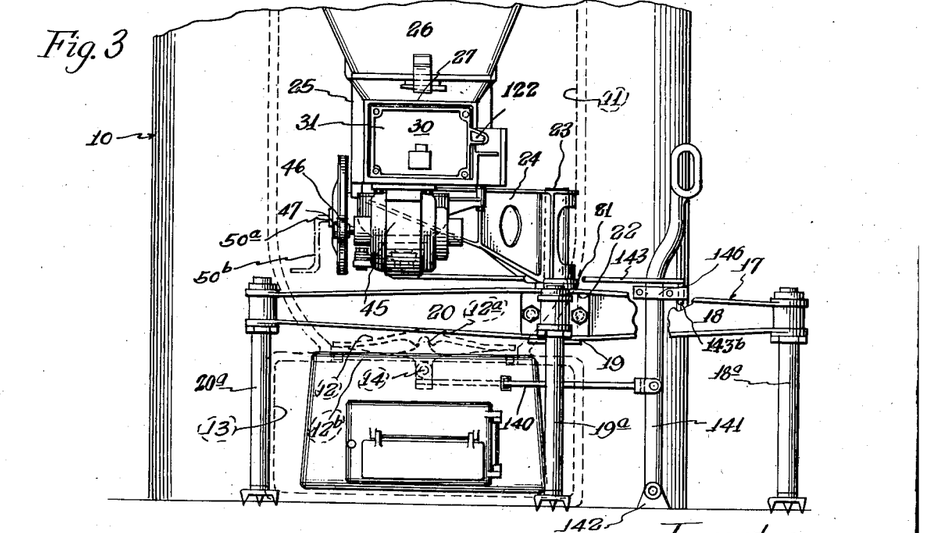
Figure 3 is a rear end view of the device shown in Figure 1 looking toward the furnace and drawn to the same scale as Figure 1.

The opposite end of the connecting rod 143 has detachable connection with the shaking lever 141, in the form shown said connection consisting of a bracket 146 clamped on the lever 141 and having a vertical hole 147 therein adapted to receive a downwardly bent end portion 143ᵇ of the connecting rod 143. This construction is best shown in Figures 3 and 5.

With the construction just described, it will be seen that the grate will be shaken down each time the feeding mechanism operates. The effective stroke of the grate is adjustable by means of the slotted connection between connecting rod 143 and the crank arm 144, so as to eliminate substantially all of the ash each time the grate is shaken, and therefore maintain substantially uniform characteristics of the fire.

Although the various parts of the operating and control mechanism have been described in detail, a brief résumé of the operation of the principal parts may be desirable to show the co-operation between the control, the automatic feeding and the automatic shaking mechanism during a complete cycle of operation.

With the feeding and control mechanism in their idle or inoperative position shown in Figures 1, 2, and 8, the shovel 30 and ram 35 are in their outwardmost position so long as the contact member 76 or control arm 77 is maintained at a predetermined height on the top of the fire bed. As the fuel is consumed so as to permit the arm to drop below this predetermined height, the control rod 87 is pushed longitudinally so as to rock the starting switch 98 and initially close the operating circuit for the motor. The ram and shovel are then started inwardly toward the fire as shown in diagram in Figure 10, the shovel being connected by pawl 60 to the ram. When the ram has moved forwardly a short distance, the trip lever 115 is swung on its pivot by tension of spring 118 a sufficient distance to rock the carry-over switch 97 into closed position, as shown in Figure 11.

Forward movement of the ram and shovel is continued until the pawl 60 moves into engagement with the stop 66. In Figure 6 the parts are shown with the shovel in dotted lines where the pawl 60 has almost reached the stop 66 and the forward end of the shovel has almost reached a position substantially over the center of the fire bed.

Just before the shovel is disengaged from the ram, projection 122 carried by said shovel engages the rear end of the control rod 87 so as to lift the control arm and contact member 76 from the top of the fire bed. The shovel and control arm are maintained in this position by engagement of the upper pawl 61 with the shoulder 27ᵇ as shown in Figure 7. As the pawl 60 is released, further forward movement of the shovel ceases, but the ram is continued in its forward movement as indicated in Figure 12.

After the forward movement of the shovel has ceased and the control arm 77 is in raised position, as described, the forward movement of the ram 35 continues so as to discharge the fuel from the shovel and spread it upon the top of the fire, which it will be understood is now unobstructed by the contact member. The ram is moved forwardly until stop 123 carried therewith engages the trip lever 115 and through snap operation of the carrier 95ᵃ throws the reversing switches 93 and 94 into reverse position as shown in Figure 13.

The ram is then moved rearwardly, picking up the shovel. Projection 122 on the latter is then moved from engagement with control rod 87 so as to release the control arm and contact member and permit the latter to drop upon the top of the newly-fed fuel. The shovel and ram are returned to their initial or starting position where the reverse and carry-over switches are thrown over into the position indicated in Figure 8, whereupon the motor circuit is automatically opened to stop operation of the mechanism, provided, of course, sufficient fuel has been added to support the contact member 76 at the proper height. If not, the starting switch 98 will again be closed to start another feeding cycle.

During each feeding cycle, the shaking mechanism is operated from the same shaft 54 that operates the feeding ram.

It will be observed further that the spring 130 on control rod 87 is normally placed under compression, which is increased by the weight of the contact control arm 75 acting thereagainst. Consequently, when the feeding mechanism including the main casing 25 is pivotally swung away from the front of the furnace fuel door, as indicated in dotted lines in Figure 5, the pressure on spring 130 is relieved and the control rod is urged forwardly thereby so that finger 105 is moved a substantial distance from the starting switch 98. In this manner danger of accidental starting of the feeding mechanism is practically eliminated.

Figure 14:
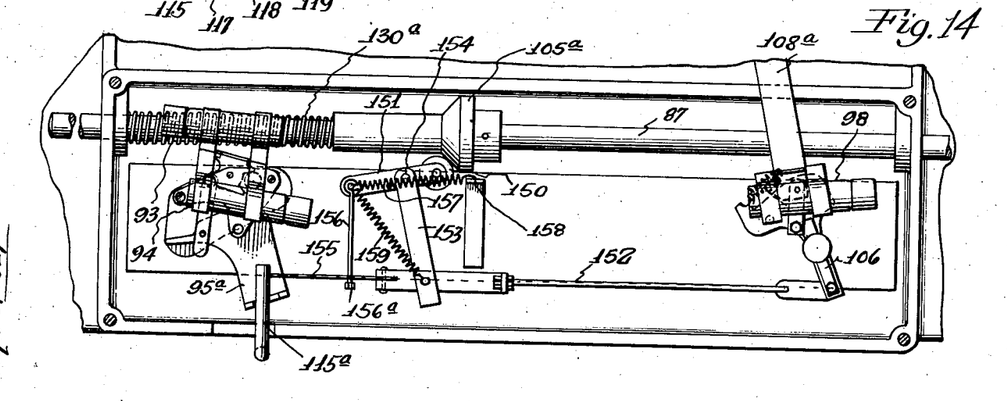
Figure 14 is a view of a modified form of control mechanism which may be used in place of the control mechanism shown in detail in Figure 8.
Figure 15:
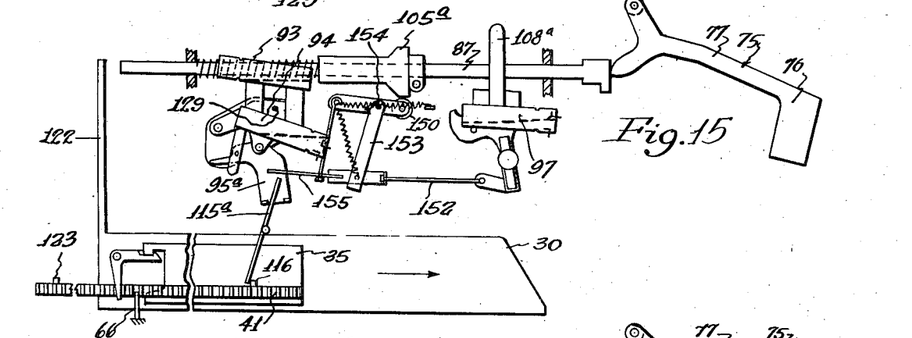
Figures 15 and 16 are diagrammatic views illustrating certain operating positions of the parts of the modified form of control mechanism shown in Figure 14 during certain stages of the feeding operation.
Figure 16:
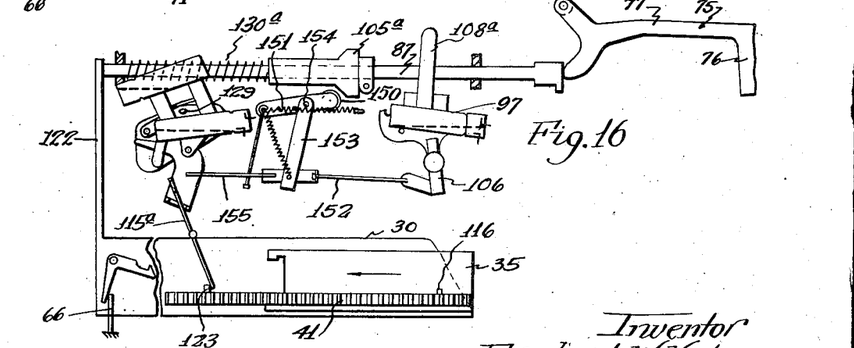

In the modified form of switch control mechanism shown in Figures 14, 15, and 16, the starting switch 98 and reversing switches 93, 94 with their circuit connections are arranged as in the previously described mechanism, but the carry-over switch has been omitted. In its stead, an intermediate system of control levers is provided which are arranged to hold the starting switch in closed position during the entire feeding cycle. Said intermediate control system comprises a cam member 105ᵃ fixed on the control rod 87 under forward compression of spring 130ᵃ, a rocking contact lever 151 having a roller 150 adapted to engage said cam member, and a horizontally disposed rod 152 connected to the lower end of the starting switch lever 106 and suspended by link 153. The link 153 and the intermediate part of rocking lever 150 are each pivoted about a pin 154. A rearward extension 155 of rod 152 is relatively flexible in a vertical direction. The free end of the contact lever 151 opposite its roller 150 has a vertically disposed rod 156 depending therefrom, which extends through said extension and has a stop 156ᵃ at its lower end.

When in normal position, the extension 155 is adapted to engage and form a stop for the upper end of trip lever 115ᵃ which corresponds to trip lever 115 of the previously described construction, but when said extension is flexed upwardly by the rod 156, it moves above said trip lever and permits the latter to swing forwardly thereunder, as shown in Figure 15.

A tension spring 157 is connected between the free end of contact lever 151 and a fixed point 158 in a direction substantially in line with the pivot point 154 of said lever, when the latter is depressed by the cam, as shown in Figure 15. A second tension spring 159 connects the free end of lever 151 with the lower end of link 153.

The operation of the modified form of control mechanism above described is as follows:

Figure 14 shows the parts in the inoperative position, with the starting switch open, and with spring 159 urging the extension 155 of rod 152 into engagement with one end of trip lever 115ᵃ. The opposite end of the latter lever, however, is normally held from rearward movement by stop 116 on rack 41 (see Fig. 15). As the fuel level lowers, the contact control arm 75 drops and pushes the control rod 87 inwardly, thereby forcing cam 105ᵃ against roller 150 and rocking contact lever 151 on its pivot 154. This pulls the rod 156 upwardly and flexes the extension 155 so as to carry it over the end of trip lever 115ᵃ. The rod 152 and extension 155 are then free to be shifted longitudinally under tension of spring 159, into the position shown in Figure 15, whereupon the starting switch 98 is rocked into closed position. The shovel and ram are then moved forwardly. The control arm 75 will be raised, and in doing so, the cam 105ᵃ will be pushed forwardly so as to relieve the lever 151, as shown in Figure 16. This permits the flexible extension 155 to resume its normal horizontal position, so that it will be in the path of movement of lever 115ᵃ when the latter is swung forwardly by pin 116 at the end of the return stroke of the ram.

The starting switch will thereupon be rocked into open position by the lever 115ª, acting through extension 155 and rod 152 as described. In other respects, the control mechanism, including the reversing switches, operate in the same manner as the first described mechanism shown in Figure 8.

Figures 15, 16, and 17 also illustrates a modified form of pawl 160 for connecting the shovel and ram. Instead of being actuated by gravity, it is controlled by a coil spring 161 arranged to urge said pawl positively into locking position excepting when engaged by the stop 66.

In Figure 25, a modified construction is shown, in which the control arm 75 is raised automatically by the shovel 30ª, one side wall 31ª of which is inclined along its front edge and engages a roller 75ª mounted on said control arm. With this arrangement, the control arm is raised each time the shovel is advanced, to discharge fuel on the fire, and is permitted to drop again as the shovel recedes.

Figure 18:
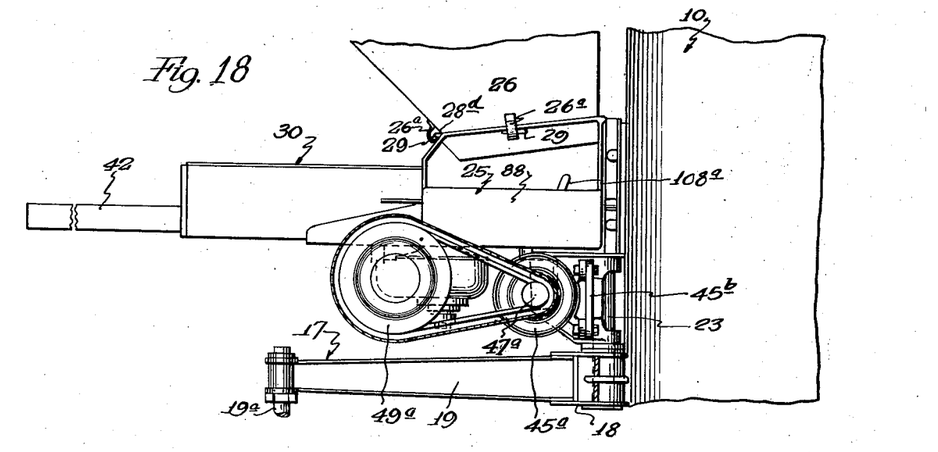
Figures 18 and 19, respectively, are side and rear views of a modified or alternative construction for mounting the driving motor.
Figure 19:
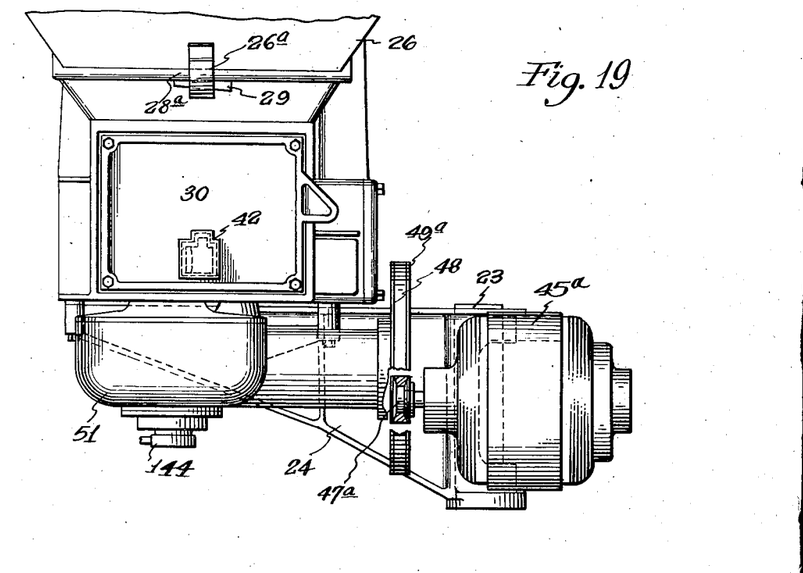

Referring to the modified construction for mounting the motor illustrated in Figures 18 and 19, the parts of the mechanism are the same as those shown in Figures 1, 2, and 3, excepting for the position of the driving motor 45ª which is transferred to a base plate 45ᵇ forming part of the main supporting bracket 24ª adjacent upright pivot pin 23 on which the entire feeding mechanism is hinged. The pulley 49ª is in this form, transferred to the opposite end of the cross shaft 50, to be in line with the driving pinion 47ª. This construction may be preferred as somewhat more compact, and as a means of supporting the weight of the motor nearer its hinged support.

Although I have illustrated and described certain embodiments of my invention, it will be understood that I do not wish to be limited to the exact construction shown and described, but that various changes and modifications may be made without departing from the spirit and scope of my invention.

I claim:

1. In a furnace, a fire box, a fuel opening therefor, fuel feeding means including a horizontally reciprocating shovel for discharging fuel into the fire box, power means for actuating said shovel, and control means for said power means responsive to variations in height of said fuel bed, including a vertically movable contact member projecting into said fire box and adapted to rest upon the top of the fire bed within said fire box, and means detachably supporting said contact member within said fuel opening independent of said fuel feeding means and shovel, the shovel being removable from the furnace without disturbing said contact member.

2. In a stoker and in combination with a furnace, to fuel hopper, a casing supporting said hopper and forming a horizontally disposed fuel passage, said hopper having a vertically opening discharge passage communicating with said horizontal passage, a shovel reciprocably movable along said casing under said vertical passage adapted in one position to receive fuel deposited by gravity therefrom, means for moving said shovel forwardly along said fuel passage, and for ejecting the fuel from said shovel at a point remote from said vertical discharge passage, said horizontal passage having a restricted portion disposed a substantial distance forwardly of said vertical passage but affording substantial clearance above said shovel whereby lumps of fuel projecting above the top of said shovel may pass through said restricted opening during the forward feeding movement of said shovel.

3. In a stoker adapted to feed fuel to a furnace, a frame, a fuel hopper thereon having a vertically opening discharge passage, a reciprocating shovel having means for moving it under said discharge passage adapted in retracted position to receive fuel deposited by gravity from said discharge passage and in advanced position to carry said fuel to a feeding position relative to said furnace, a ram telescopically mounted in said shovel, means for moving said ram relative to said shovel operative to eject fuel from said shovel when the latter is in its advanced position, said shovel having a top plate extending rearwardly therefrom adapted to form a closure for said discharge passage of the fuel hopper when said shovel is in its advanced position, and said ram also having a horizontal plate extending rearwardly therefrom and telescopically positioned beneath said first named horizontal plate to form a closure with the latter when said ram extends forward therebeyond.

4. In a stoker adapted to feed fuel to a furnace, a fuel hopper, a casing supporting said hopper and forming a horizontally disposed fuel passage, said hopper having a vertically opening discharge passage communicating with said horizontal passage, a reciprocably movable shovel in said casing having a horizontal bottom plate, and a horizontal top plate adjacent its rear end, said shovel being adapted in retracted position to receive fuel in its forward end deposited by gravity from said hopper and adapted in forwardly extended position to project said horizontal top plate beneath said discharge passage of the fuel hopper to form a closure thereunder, a ram telescopically mounted in said shovel, means for reciprocably moving said ram, means for connecting said shovel with said ram to move with the latter during a portion of the travel of said ram, said ram having a horizontal plate extending rearwardly therefrom beneath said first named horizontal plate adapted to form an extended closure between said first named plate and said ram when the latter is extended forwardly in said shovel.

5. In a stoker adapted to feed fuel to a furnace, a fuel hopper, a casing supporting said hopper and having a horizontally disposed fuel passage, said hopper having a vertically opening discharge passage communicating with said horizontal passage, a reciprocating shovel mounted in said horizontally disposed fuel passage and having a telescopically movable ram mounted therein for discharging fuel from said shovel, and a top plate carried by the rear end of said shovel adapted to cover said ram when the latter is retracted in said shovel in loading position beneath said vertically opening discharge passage of the hopper, and means operated in timed relation with the forward feeding movement of said shovel causing extension of said ram within the latter to discharge fuel therefrom.

FREDERICK W. VODOZ.